United States Patent
Chung et al.

(10) Patent No.: US 11,151,728 B2
(45) Date of Patent: Oct. 19, 2021

(54) STRUCTURE MONITORING SYSTEM AND METHOD

(71) Applicant: Ship and Ocean Industries R&D Center, New Taipei (TW)

(72) Inventors: Cheng-Hsien Chung, New Taipei (TW); Hua-Tung Wu, New Taipei (TW); Hsin-Haou Huang, New Taipei (TW)

(73) Assignee: SHIP AND OCEAN INDUSTRIES R&D CENTER, New Taipei (TW)

(*) Notice: Subject to any disclaimer, the term of this patent is extended or adjusted under 35 U.S.C. 154(b) by 37 days.

(21) Appl. No.: 16/724,104

(22) Filed: Dec. 20, 2019

(65) Prior Publication Data

US 2021/0192753 A1    Jun. 24, 2021

(51) Int. Cl.
*G06T 7/246*    (2017.01)
*G06T 7/00*    (2017.01)

(52) U.S. Cl.
CPC ............ *G06T 7/246* (2017.01); *G06T 7/0004* (2013.01); *G06T 2207/10048* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 2005/0075846 A1* | 4/2005 | Kim | G01N 29/245 703/1 |
| 2016/0225155 A1 | 8/2016 | Park et al. | |
| 2017/0241286 A1* | 8/2017 | Roberts | F01D 17/02 |
| 2017/0322072 A1 | 11/2017 | Wakita | |
| 2018/0104742 A1* | 4/2018 | Kottilingam | B33Y 50/02 |

FOREIGN PATENT DOCUMENTS

| CN | 102330645 A | 1/2012 |
|---|---|---|
| CN | 102519383 A | 6/2012 |
| CN | 105372327 A | 3/2016 |
| CN | 106225708 A | 12/2016 |
| CN | 109186902 A | 1/2019 |
| CN | 109870279 A | 6/2019 |
| ES | 2382293 A1 | 6/2012 |
| KR | 10-2007-0066541 A | 6/2007 |

* cited by examiner

Primary Examiner — Leon Flores
(74) Attorney, Agent, or Firm — Cheng-Ju Chiang

(57) ABSTRACT

The present invention discloses a structure monitoring system comprising a plurality of marking units disposed on a structural object, a monitoring device monitoring the plurality of marking units remotely, and a data processing device connected to the monitoring device. The aforementioned data processing device further comprises a data receiving module and a data processing module. The data receiving module receives a data detected by the monitoring device, and the data processing module calculates and analyzes the information. In addition, a structural monitoring method has also been provided.

10 Claims, 9 Drawing Sheets

Singular values diagram

Mode shape

STRUCTURE MONITORING SYSTEM AND METHOD

TECHNICAL FIELD

The present invention relates to a structure monitoring system and method, and more particularly, to a structure monitoring system and method by non-destructive monitoring.

BACKGROUND OF RELATED ARTS

Structural health monitoring (SHM) is to use non-destructive detecting or monitoring whether a structure is damage, and reduce the impact for operation on structure. Structural health monitoring system usually continuously monitors the health status of the whole structure through sensors, data acquisition, analysis system, monitoring center and various software and hardware. In addition to early assessment and identification of structural damage to prevent catastrophic damage, it can also explore the causes of damage and improve the structural design for next generation.

At present, traditional sensors are widely used in structural health monitoring, such as acceleration gauge and strain gauge. However, there are various problems, including expensive price, long installation time, sensor fatigue and cumbersome lines, which cause inconvenience to constructer. Take a wind turbine of 50 meters long as an example, it may be necessary to stick hundreds of strain gauges for monitoring.

In order to overcome the above problems, some experts proposed a method of image measuring to carry out structural health monitoring. In recent years, the method of image measurement has been widely used in various experimental mechanics. Compared with the traditional attached sensor measurement, the image measurement provides a non-contact measurement technology, which can be used to measure the whole area without disturbing the object to be measured. However, there are many difficulties in the field test of image measurement, such as the change of light, the obscuration of objects, shadow and background interference, which will affect the results of image measurement.

SUMMARY

In view of the deficiencies of the prior arts, the invention provides a structure monitoring system, which can effectively solve the problem that the traditional image equipment cannot be measured in the environment of poor line of sight or shelter. The structure monitoring system comprises a plurality of marking units configured on a structural object; a monitoring device to monitor the plurality of marking units remotely; and a data processing device connected to said monitoring device, wherein said data processing device comprises a data receiving module connected to the monitoring device and a data processing module connected to the data receiving module.

According to an aspect, the invention provides a method of structure monitoring includes the following steps: (A) installing a plurality of marking units on a structural object; (B) monitoring the structural shifting generated by each marking unit to obtain a shifting image of each marking unit; (C) obtaining a shifting signal of each marking unit through image processing based on the shifting image; and (D) calculating a modal parameter of the structural object based on the shifting signal of each marking unit.

According to another aspect, the present invention discloses a method of structure monitoring includes the following steps: (I) configuring a plurality of marking units on a structural object; (J) monitoring the structural displacement generated by a part of all marking units at a time interval to obtain a displacement image of the part of all marking units; (K) repeating the step (J) until obtaining the displacement image of each of all marking units; (L) obtaining a displacement signal of each marking unit by image processing based on the displacement image; and (M) reorganizing the displacement signal of each marking unit and calculating a modal parameter of the structural object.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

In order to reduce the maintenance cost and the influence for an operation of structure, and avoid the serious damage or failure of the structure, it is an important issue to develop a reliable structure health monitoring system (also known as non-destructive monitoring system) and method. Accordingly, the invention proposes a structure monitoring system and method, in which an infrared thermal imaging device (also called an infrared camera or thermal imaging camera or thermal imager or thermographic camera) is used as a monitoring device, and a heating element installed on the structural object is used as a structure mark point to record the response of the structural object. Because the system uses infrared thermal image technology to monitor the mark points, it can be applied to the environment under poor vision or obstructed objects to effectively solve the problems faced by the previous technology.

Figure 1:
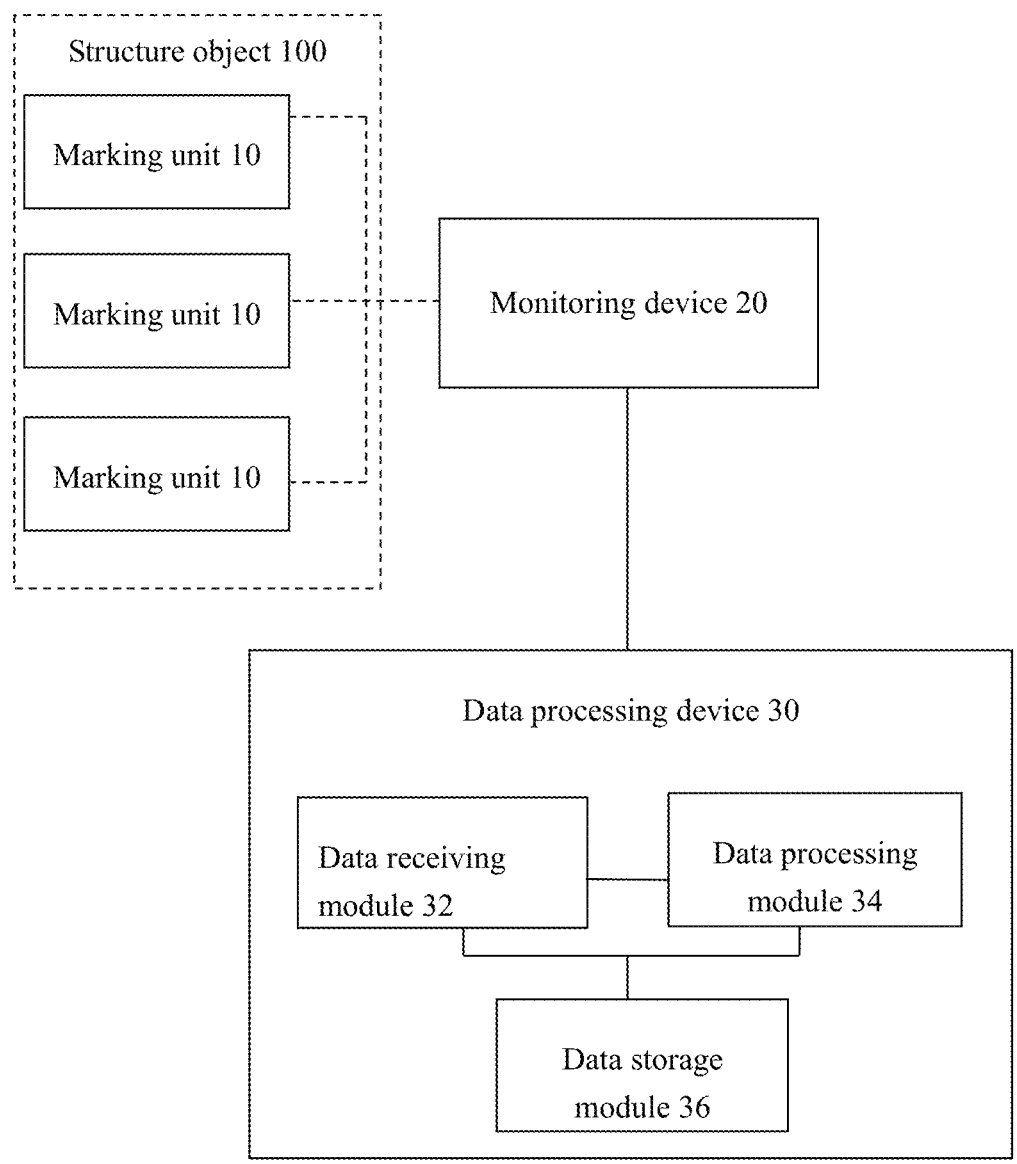
FIG. 1 illustrates a schematic diagram of a structure monitoring system of a preferred embodiment of the present invention.

First, please refer to FIG. 1, it illustrates a schematic diagram of a structure monitoring system of a preferred embodiment of the present invention. As shown in FIG. 1, the structure monitoring system 1 of the invention includes a plurality of marking units 10 installed on a structural object 100; a monitoring device 20 remotely monitoring the plurality of marking units 10; and a data processing device (unit) 30 connected with the monitoring device 20. The data processing device 30 may also include: a data receiving module 32 connected with the monitoring device 20 for receiving the information monitored by the monitoring device 20; and a data processing module 34 connected with the data receiving module 32 for further calculating and analyzing for the information.

In addition, the data processing device 30 also includes a data storage module 36 connected with the data receiving module 32 or/and the data processing module 34, which can store the information received by the data receiving module 32 or/and the information calculated and analyzed by the data processing module 34, so as to facilitate the subsequent maintenance of the structural object 100.

In this embodiment, the structural object 100 can be a pier, a wind turbine, lighthouse or a building, etc., and the invention is not being limited to these.

In this embodiment, the monitoring device 20 is an infrared thermal imager, and the plurality of marking units 10 installed on the structural object 100 are heating elements such as electric heating sheets that can be detected by the infrared thermal imager. However, any heating element that can be detected by the infrared thermal imager is within the protection scope of the invention.

In particular, the structure monitoring system 1 of the present invention operates in such a way that the plurality of marking units 10 (in this case, electric heating sheets) are distributed mounting on the structural object 100, and a monitoring device 20 (in this case, an infrared thermal imaging device) is mounted at a remote distance of the structural object 100 to remotely detect the marking units 10 at any time. However, when the structural object 100 vibrates due to external force (such as earthquake), or generates random vibration (such as gust response or wave action of offshore fan or drilling platform) which cannot be described by a certain function, it will cause a little structural shifting of each marking unit 10. At this time, the monitoring device 20 will record the shifting (heat) image of each marking unit 10 and transmit to the data processing device 30.

After the data receiving module 32 of the data processing device 30 receives the shifting (displacement) images, the data processing module 34 uses the image processing technology to convert the shifting (displacement) images into a displacement signal of each marking unit 10, and then calculates the modal parameters of the structural object 100 through the shifting (displacement) signals, including natural frequency, modal vibration, damping and other parameters of the structural object 100 and not limited to these.

The data storage module 36 can store at least one shifting (displacement) image, the displacement signal, the modal parameters and their historical data. The user can compare the modal parameters calculated by the data processing device 34 with those in the historical data to check whether there is a significant deviation; if so, it indicates that the structural object 100 may fail or have internal damage, it should be maintained immediately to avoid irreparable damage of the structural object 100. Specifically, the historical parameters in this embodiment refers to that the data of modal parameters are set up through the time axis, and each real-time modal parameter is provided (strung) on the time axis to form the historical parameter for the user to monitor.

The installed location of the marking units of the structural object 100 which is an offshore wind turbine is described as the following.

Figure 2:
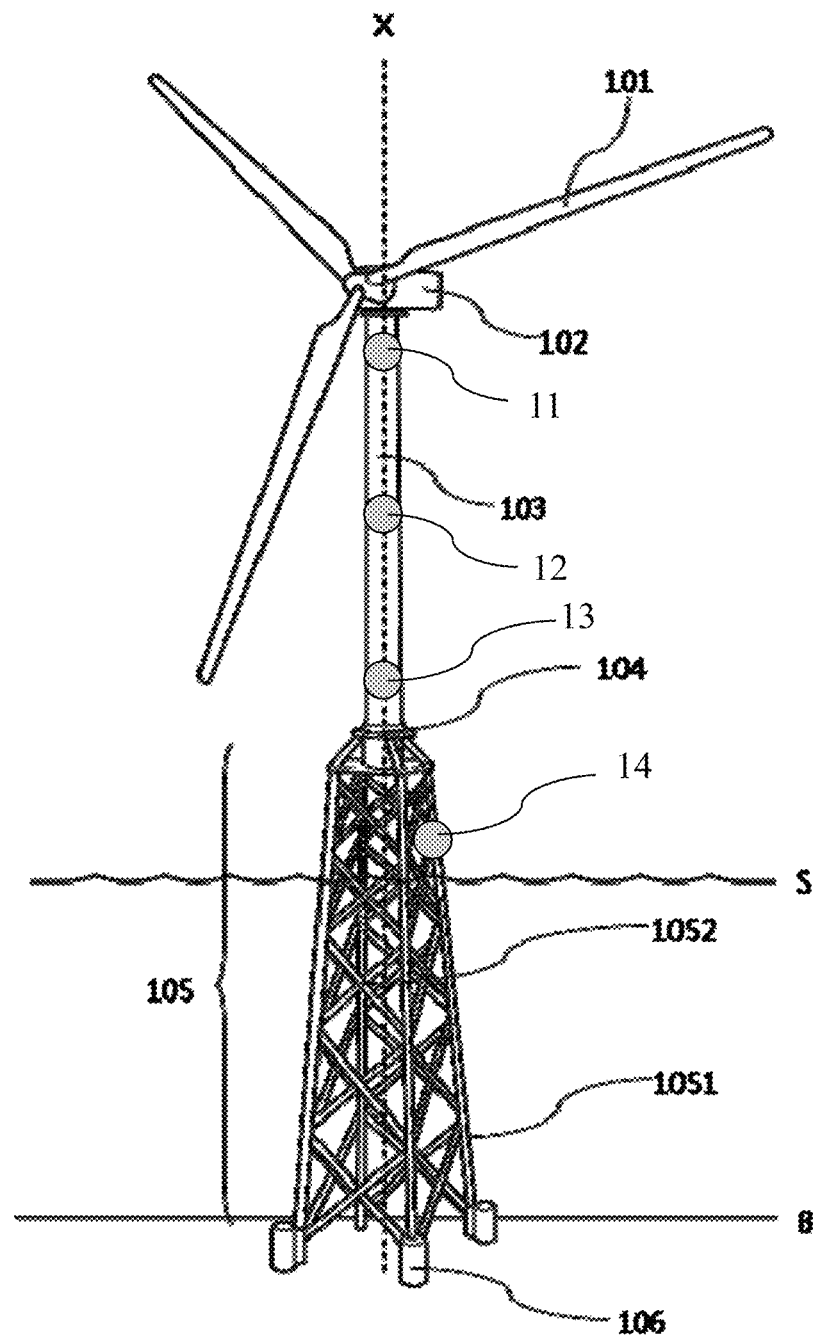
FIG. 2 illustrates a schematic diagram of the offshore wind turbine structure and marking units of the preferred embodiment of the present invention.

Please refer to FIG. 2, it illustrates a schematic diagram of the offshore wind turbine structure and marking units of the preferred embodiment of the present invention. As shown in FIG. 2, the offshore wind turbine 100 used in this embodiment includes over-water structure and under-water structure. Specifically, the offshore wind turbine 100 defined in this embodiment should be viewed as a whole with a pile module 106, a sleeve structure 105, a platform 104, a tower stand 103 and an engine room 102.

The engine room 102 of this embodiment is connected with the tower stand 103, and the engine room 102 is further connected with a plurality of blades 101. The tower stand 103 is connected with the platform 104, the platform 104 is connected with the sleeve structure 105, and the platform 104 is arranged above the water level S. The sleeve structure 105 is connected with the pile module 106, and the sleeve structure 105 is set in the sea. The pile module 106 is set on the sea bed. In this embodiment, the sleeve structure 105 further comprises at least three supporting feet 1051 and a plurality of braced frames 1052. In this embodiment, four supporting feet 1051 are configured, and a plurality of braced frames 1052 are arranged in an X-shaped cross between the four supporting feet 1051.

In this embodiment, the plurality of marking units 10 are installed at different positions on the structure of the offshore wind turbine 100 to achieve the optimal monitoring effect. The installed marking units include a first marking unit 11, a second marking unit 12, a third marking unit 13 and a fourth marking unit 14.

Further, the first marking unit 11 is arranged on the inner wall of the tower stand 103 close to the engine room 102, at a position within five meters below the junction (connecting position) of the top of the tower stand 103 with the engine room 102; the second marking unit 12 is located on the inner wall of the tower stand 103 between the engine room 102 and the platform 104, at a position on the middle section of the tower stand 103; and the third marking unit 13 is located on the inner wall of the tower stand 103, at a position within plus or minus five meters of the junction of the platform 104 and the tower stand 103.

In this embodiment, the first marking unit 11, the second marking unit 12 and the third marking unit 13 are arranged on the axis X, and the fourth marking unit is further provided on the offshore wind turbine, outside the axis X. Thus, the first marking unit 11, the second marking unit 12, the third marking unit 13 and the fourth marking unit 14 will form a three-dimensional space to facilitate the measurement of torsional motion amplitude of the structure of the offshore wind turbine 100. In addition, other marking units may be added according to the structural requirements of the offshore wind turbine 100 as additional marking points, and the invention is not being limited to four number of marking units.

Figure 3:
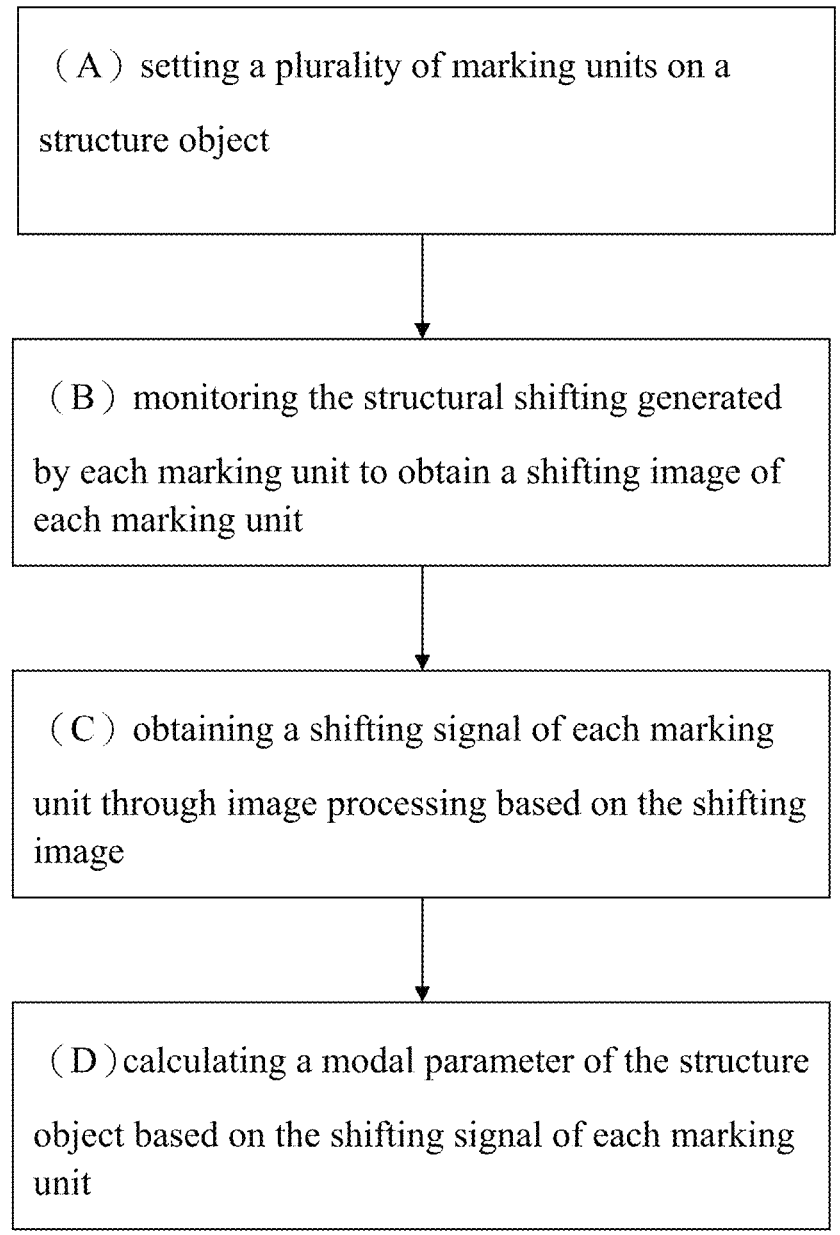
FIG. 3 illustrates a flow chart of the structure monitoring method of the preferred embodiment of the present invention.

Please refer to FIG. 3, it illustrates a flow chart of the structure monitoring method of the preferred embodiment of the present invention. As shown in FIG. 3, the structure monitoring method of this embodiment includes the following steps: (A) installing a plurality of marking units 10 on a structural object 100; (B) monitoring the structural shifting (displacement) generated by each marking unit 10 to obtain a shifting (displacement) image of each marking unit 10; (C) obtaining a shifting (displacement) signal of each marking unit through image processing based on the shifting (displacement) image; and (D) calculating a modal parameter of the structural object based on the shifting (displacement) signal of each marking unit.

In the step (A), the installed plurality of marking units 10 are heating elements such as electric heating sheet which can be detected by the infrared thermal imaging device. In other embodiments, any heating element which can be detected by the infrared thermal imaging device is within the protection scope of the invention. The structural object 100 can be a pier, a wind turbine, a building, etc. Specifically, in this embodiment, the offshore wind turbine is used as the structural object 100, and the installation position of the marking units 10 can refer to FIG. 2, while the actual structural object 100 to be monitored and the installation quantity and position of the marking units can be replaced according to the demands.

In the step (B), the monitoring device 20, such as the infrared thermal imaging device, is used to monitor the marking unit 10 installed on the structural object 100. Since the marking unit 10 is a heating element that can be detected by the infrared thermal imaging device, the thermal image of each marking unit 10 can be obtained. In addition, when the structural object 100 vibrates due to external force (such as earthquake), or generates random vibration (such as gust response or wave action of offshore wind turbine or drilling platform) which cannot be described by a certain function, it will cause structural displacement of each marking unit 10. The monitoring device can take and record the displacement image (displacement thermal image) of each marking unit 10 and transmit to the data processing apparatus 30.

In the step (C), the data receiving module 32 of the data processing device 30 receives the displacement image of each marking unit 10, and the data processing module 34 connected with the data receiving module 32 uses the image processing technology to obtain a displacement signal of each marking unit 10. Finally, in the step (D), the data processing module 34 calculates modal parameters of the structural object 100 based on the displacement signal of each marking unit 10. The modal parameters of the structural object 100 include the natural frequency, modal vibration, damping and other parameters of the structural object, and the present invention is not being limited to these parameters.

In addition, the monitoring method of this embodiment can further include the step (E) to store the displacement image, the displacement signal or the modal parameters. Specifically, the data storage module 36 of the data processing device 30 is used to store the aforementioned information of the displacement image, the displacement signal and/or the modal parameters, and build them on the time axis to form a historical data. The user can compare the modal parameters of the structural object calculated by the data processing device 30 with the modal parameters in the historical data to check whether an obvious deviation is found; if it is, it indicates that the structural object 100 may be faulty or damaged internally, and should be maintained or repaired immediately.

However, in monitoring a large-scale structural object, as the monitoring device is used to detect all marked points of the large-scale structural object at one time, it is necessary to adjust the monitoring device with a short focal length of lens. At this time, the monitoring device can detect a large range of target, but the hot image size of the marked points in the target will be relatively small, and it is not easy to determine the structural displacement produced by each marking unit.

In view of the above-mentioned method, the invention proposes another structure monitoring method. The method is to adjust the monitoring device with a long focal length of lens, detect only a part of the mark points at a time (the hot image size of the detected mark points is larger and clear, which is helpful to judge the structural displacement of the mark points), and set a time interval to adjust the detection direction of the monitoring device until all the marked points on the structural object are detected, and then reorganize according to the time interval and the detected data to obtain the complete modal parameters of large-scale structural object.

Figure 4:
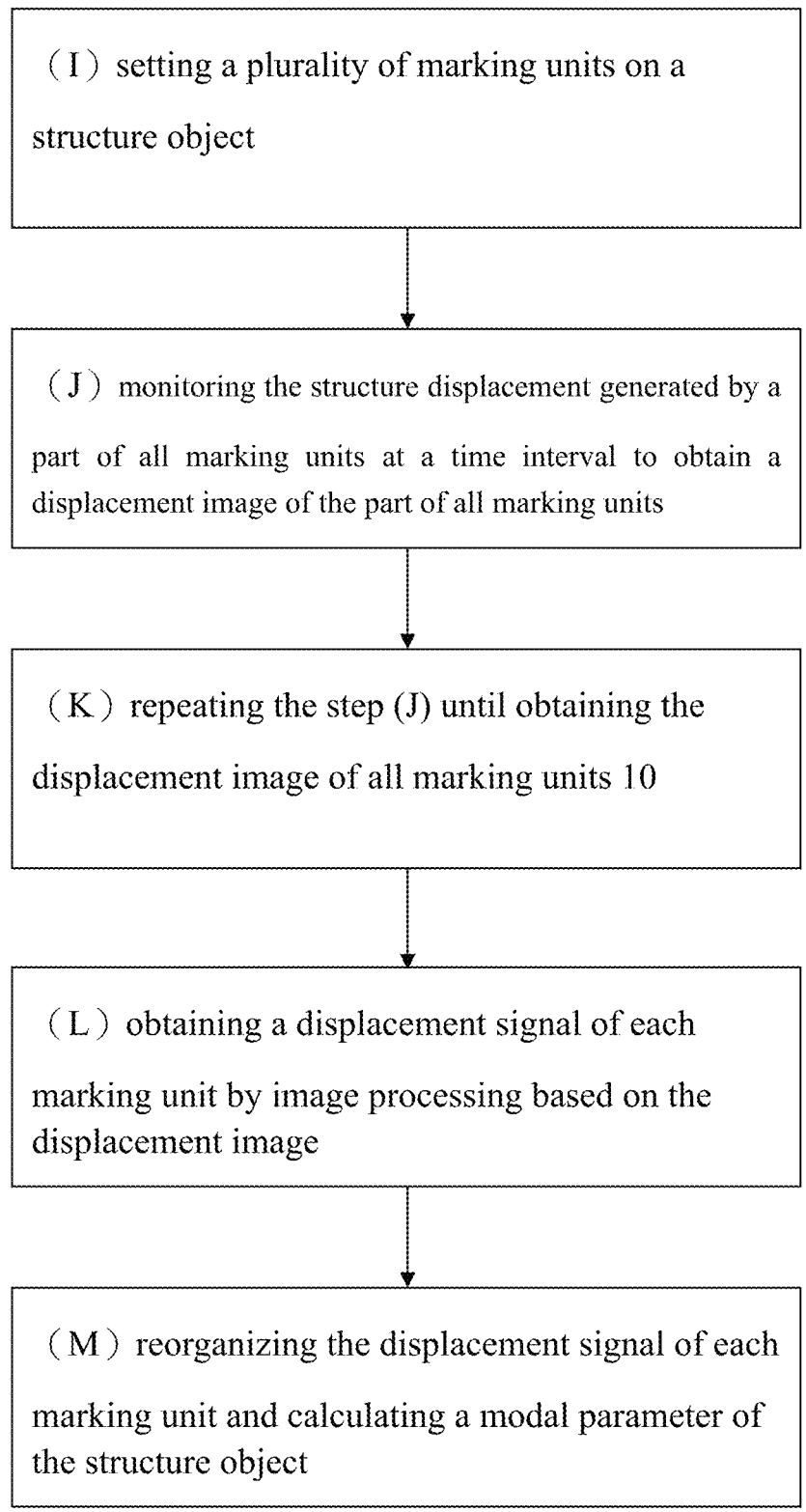
FIG. 4 shows a flow chart of the structure monitoring method of another preferred embodiment of the invention.

Please refer to FIG. 4, it illustrates the flow chart of the structure monitoring method of another preferred embodiment of the invention. As shown in FIG. 4, the structure monitoring method of this embodiment includes the following steps: (I) configuring a plurality of marking units 10 on a structural object 100; (J) monitoring the structural displacement generated by a part of all marking units 10 at a time interval to obtain a displacement image of the part of all marking units 10; (K) repeating the step (J) until obtaining the displacement image of all marking units 10; (L) obtaining a displacement signal of each marking unit by image processing based on the displacement image; and (M) reorganizing the displacement signal of each marking unit and calculating a modal parameter of the structural object.

In the step (I), the installed plurality of marking units 10 are heating elements such as electric heater which can be detected by the infrared thermal imaging device. In other embodiments, any heating element which can be detected by the infrared thermal imaging device is within the protection scope of the invention. The structural object 100 is usually a larger structure such as pier, wind turbine or building.

In the steps (J) to (L), the monitoring device 20, such as the infrared thermal imaging device, is used to monitor a part of all marking units 10 installed on the structural object 100 at a time interval. Since the marking unit 10 is a heating element that can be detected by the infrared thermal imaging device, the thermal image of the part of all marking units 10 can be obtained. In addition, when the structural object 100 vibrates due to external force (such as earthquake), or generates regular random vibration (such as gust response or wave action of offshore wind turbine or drilling platform) which cannot be described by a certain function, the structural displacement of the marking unit 10 will be generated. The monitoring device 20 can take and record the displacement image (displacement thermal image) of the marking unit 10 at a time interval and transmit to the data processing apparatus 30. Then, the data receiving module 32 of the data processing device 30 receives the displacement image of the marking unit 10, and the data processing module 34 connected with the data receiving module 32 obtains a displacement signal of the marking unit 10 by using the image processing technology. Finally, the above steps are repeated until the monitoring device 20 detects each marking unit 10 and obtains the displacement signal of each marking unit 10.

The offshore wind turbine structure in FIG. 2 can be taken as an example of the monitoring device for performing detection. First, in the first time period, the monitoring device 20 detects the thermal images of the first marking unit 11 and the second marking unit 12 at the same time and obtains the displacement images of the first marking unit 11 and the second marking unit 12 In the second time period, the monitoring device 20 adjusts the shooting direction and range of the lens to detect the thermal images of the second marking unit 12 and the third marking unit 13 at the same time and obtains the displacement images of the second marking unit 12 and the third marking unit 13. In the third period, the monitoring device 20 adjusts the shooting direction and range of the lens again to detect the thermal images of the third marking unit 13 and the fourth marking unit 14 at the same time and obtains the displacement images of the third marking unit 13 and the fourth marker units 14. After all the marking units are detected, the data processing device 30 will use the image processing technology to obtain the displacement signal of each marking unit. The time interval of the detection of the monitoring device 20 and the number of the marking units detected each time can be adjusted by user, which are not be limited to the present invention.

In the last step (M), since the aforementioned detection method will detect the same marking unit 10 in different time periods (for example, the second marking unit 12 is detected in both the first time period and the second time period) to facilitate the correction of the detection data, the data processing module 34 needs to reorganize the displacement signal of each marking unit 10 based on the time interval, and then calculate the modal parameters of the complete structural object 100. The modal parameter includes natural frequency, mode shape, damping and other parameters of the structural object, and the present invention is not being limited to these. On the other hand, after calculating the modal parameters of each marking unit 10 based on the displacement signal of each marking unit 10 (the displacement signals of some marking units are repeated), the mode shape can be reconstructed and corrected based on the time interval and the modal parameters to obtain the modal parameters of the complete structural object 100.

Figure 5:
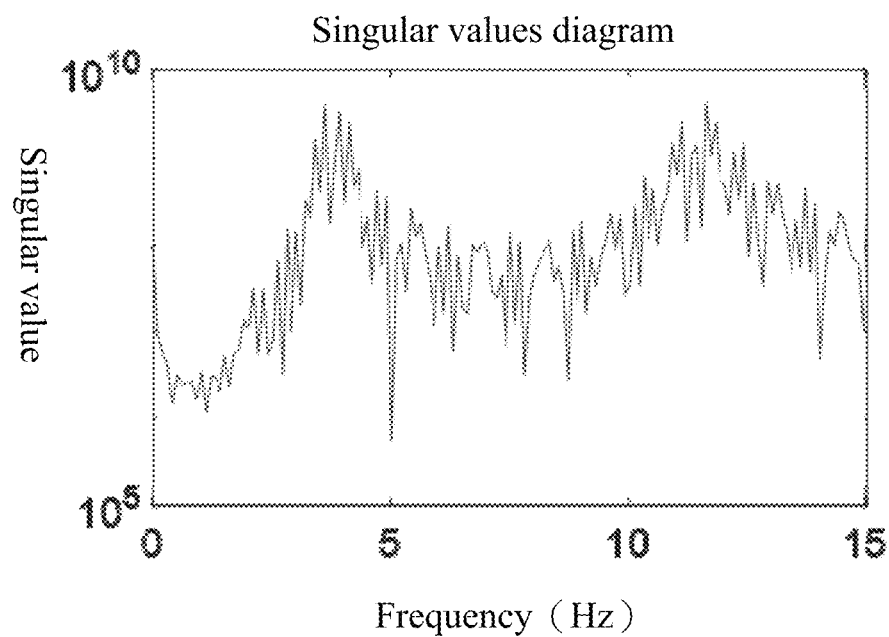
FIG. 5 illustrates a singular values diagram and a mode shape analysis diagram measured by the acceleration sensor in natural environment.
Figure 5:
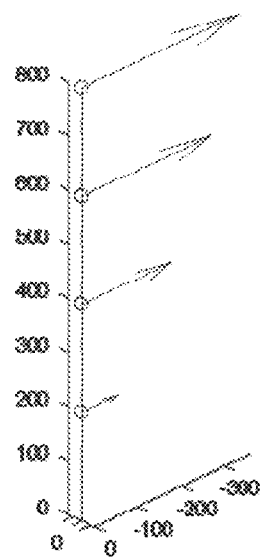
Figure 6:
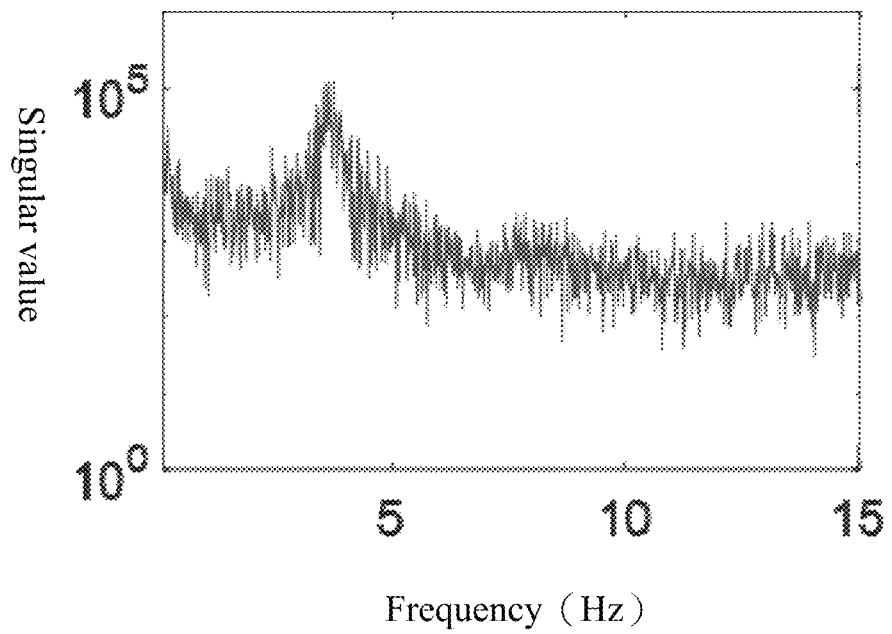
FIG. 6 illustrates a singular values diagram and a mode shape analysis diagram measured by the infrared thermal imaging device in natural environment.
Figure 6:
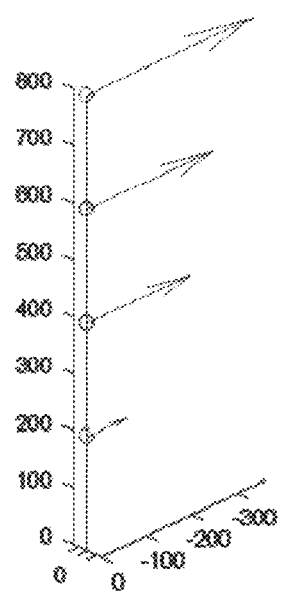

In order to verify the measurement accuracy of the infrared thermal imaging device as the monitoring device, the invention uses a traditional acceleration sensor as the control group of the experiment, and calculates the natural frequency and mode shape of the monitored structural object by the infrared thermal imaging device, the marking point and the acceleration sensor. In operational mode analysis, the frequency domain decomposition is used to calculate the modal parameters, and the singular value decomposition (SVD) is used to decompose the output power spectrum density (PSD). The mode shape is quantified by the modal assurance criterion, and the measurement results of the acceleration sensor and the infrared thermal imaging device are compared. FIG. 5 shows a singular values diagram and a mode shape analysis diagram measured by the acceleration sensor in natural environment, and FIG. 6 shows a singular values diagram and a mode shape analysis diagram measured by the infrared thermal imaging device in natural environment, in which the first natural frequency measured by the infrared thermal imaging device is 3.77 (Hz), while the natural frequency of the two measurement methods is compared with an error less than 4% (3.93%), and the modal assurance criterion (MAC) value of the two measurement methods is up to 0.9963.

Figure 7:
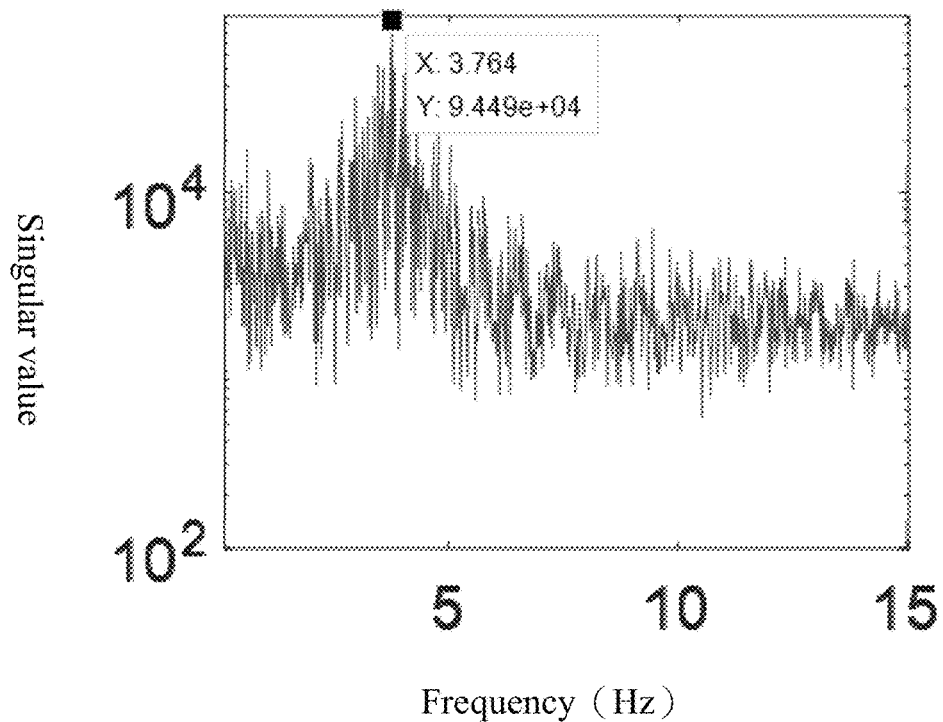
FIG. 7 illustrates a singular values diagram and a mode shape analysis diagram measured by the infrared thermal imaging device in the dark night environment.
Figure 7:
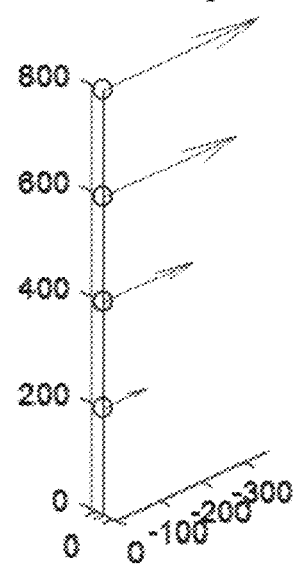

In addition, in order to highlight the advantages of the infrared thermal imaging device compared with the optical sensor (such as a camera), the invention further measures the structural object under the conditions of darkness at night, cloud, mist, water vapor and sheltered object. Please refer to FIG. 7, it shows a singular values diagram and a mode shape analysis diagram measured by the infrared thermal imaging device in the dark night environment. In the dark night environment, the average value of the first natural frequency measured by the infrared thermal imaging device is 3.69±0.22 (Hz), the error between the first natural frequency measured by the infrared thermal imaging device and the measured natural frequency under natural environment is 0.53%, and the MAC value between the two measurement environments is 0.9976+0.0020.

Figure 8:
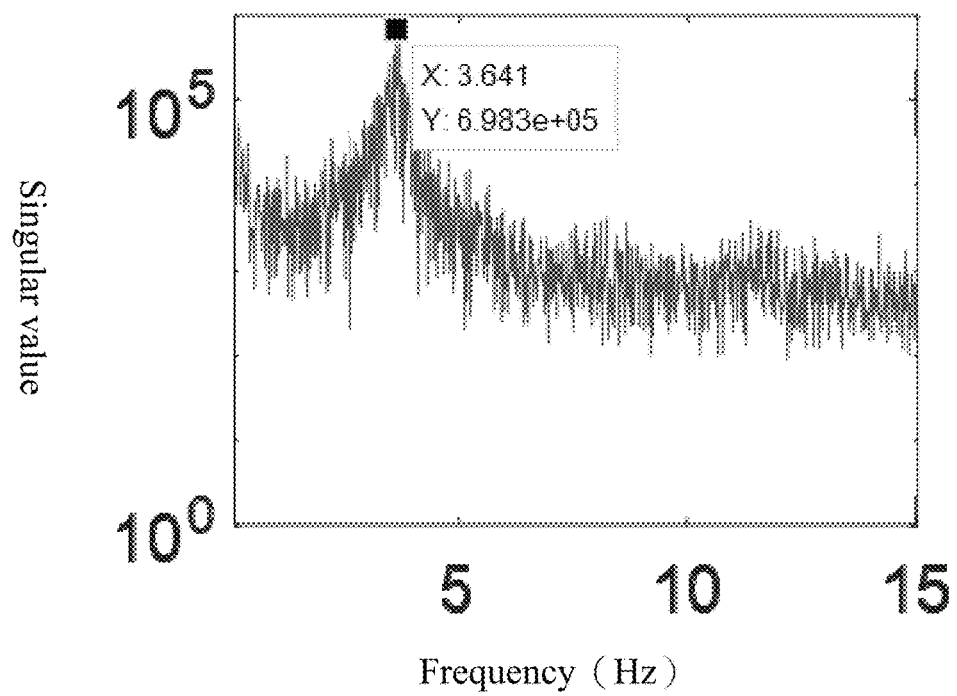
FIG. 8 illustrates a singular values diagram and a mode shape analysis diagram measured by the infrared thermal imaging device in mist or water vapor environment.
Figure 8:
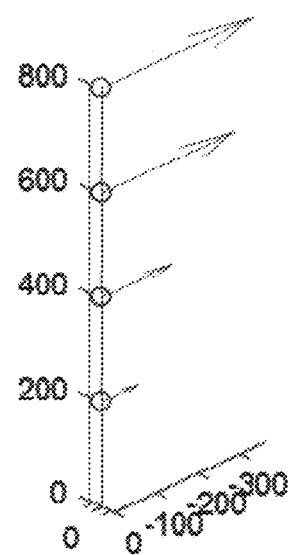

FIG. 8 shows a singular values diagram and a mode shape analysis diagram measured by the infrared thermal imaging device in mist or water vapor environment. In mist or water vapor environment, the average value of the first natural frequency measured by the infrared thermal imaging device is 3.59±0.05 (Hz), the error between the first natural frequency measured by the infrared thermal imaging device and the measured natural frequency under natural environment is 4.6%, and the MAC value between the two measurement environments is 0.9924±0.00 42.

Figure 9:
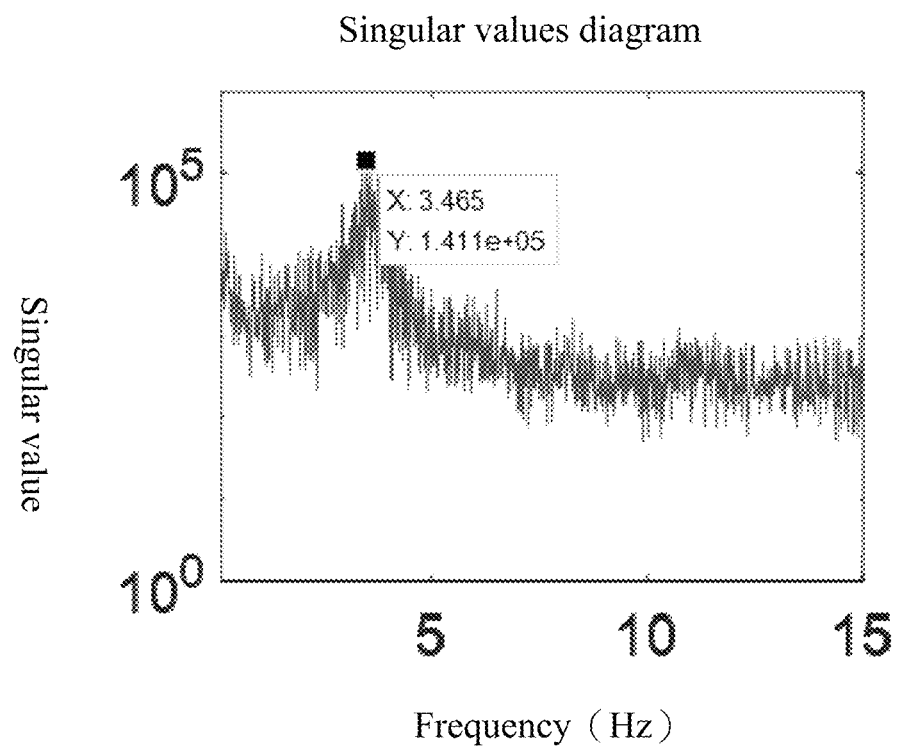
FIG. 9 illustrates a singular values diagram and a mode shape analysis diagram measured by the infrared thermal imaging device in the environment with shelter.
Figure 9:
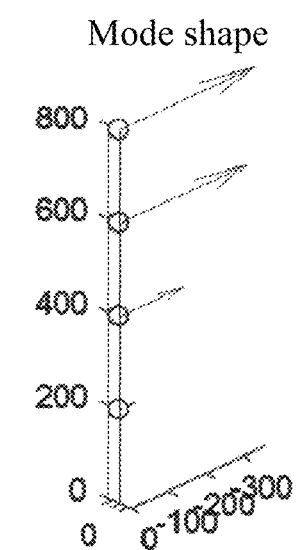

Finally, please refer to FIG. 9, it shows a singular values diagram and a mode shape analysis diagram measured by the infrared thermal imaging device in the environment with shelter. In the environment with shelter, the average value of the first natural frequency measured by the infrared thermal imaging device is 3.52±0.06 (Hz), and the error between the first natural frequency measured by the infrared thermal imaging device and the measured natural frequency under natural environment is 3.2%, and the MAC value between the two measurement environments is 0.9803±0.0033. From the above data, it can be found that the natural frequency and the mode shape calculated by using infrared thermal imaging device as the monitoring device for the measurement under dark at night, mist, water vapor and sheltered environment are all within a reasonable range, and it also has a high matching rate with the acceleration sensor.

Based on the above description, the monitoring system and method proposed in the invention have a high matching rate with the traditional sensor in the measurement value of the structural object, which proves that the accuracy level is very high, and the cost of construction and maintenance is far less than that of the traditional method which needs to large quantity sensors arranged on the structural object. On the other hand, the use of infrared thermal imaging device for measurement can also effectively solve the problem that the common optical camera is unable to measure due to poor vision or obscuration, which makes a great breakthrough in the field of structural health monitoring.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A structure monitoring system, comprising:
a plurality of electric heating sheets configured on an offshore wind turbine;
an infrared thermal imaging device to monitor said plurality of electric heating sheets remotely; and
a data processing device connected to said infrared thermal imaging device, wherein said data processing device comprises a data receiving module connected to said infrared thermal imaging device and a data processing module connected to said data receiving module.

2. The system of claim 1, wherein said data processing device further comprises a data storage module connected to said data receiving module or said data processing module.

3. The system of claim 1, wherein said infrared thermal imaging device is used to monitor a structural displacement generated by each of said plurality of electric heating sheets.

4. The system of claim 3, wherein a displacement signal of said plurality of electric heating sheets is obtained by said data processing module based on said structural displacement generated by each of said plurality of electric heating sheets.

5. The system of claim 4, wherein said data processing module calculates a modal parameter of said offshore wind turbine based on said displacement signal.

6. The system of claim 5, wherein said modal parameter comprises natural frequency, mode shape and damping.

7. A method of structure monitoring, comprising:
(A) installing a plurality of electric heating sheets on an offshore wind turbine;
(B) using an infrared thermal imaging device to monitor the structural shifting generated by each of said plurality of electric heating sheets to obtain a shifting image of each of said plurality of electric heating sheets;
(C) obtaining a shifting signal of each of said plurality of electric heating sheets through image processing based on said shifting image; and
(D) calculating a modal parameter of said offshore wind turbine based on said shifting signal of each of said plurality of electric heating sheets.

8. The method of claim 7, further comprising step (E), storing said shifting image, said shifting signal or said modal parameter.

9. A method of structure monitoring, comprising:
(I) setting a plurality of electric heating sheets on an offshore wind turbine;
(J) using an infrared thermal imaging device to monitor a structural displacement generated by a part of said plurality of electric heating sheets at a time interval to obtain a displacement image of said part of said plurality of electric heating sheets;
(K) repeating the step (J) until obtaining said displacement image of each of said plurality of electric heating sheets;
(L) obtaining a displacement signal of each of said plurality of electric heating sheets by image processing based on said displacement image; and
(M) reorganizing said displacement signal of each of said plurality of electric heating sheets and calculating a modal parameter of said offshore wind turbine.

10. The method of claim 9, further comprising step (N), storing said shifting image, said shifting signal or said modal parameter.

* * * * *